(12) United States Patent
Green

(10) Patent No.: US 8,804,102 B2
(45) Date of Patent: Aug. 12, 2014

(54) LASER SCAN SPEED CALIBRATION

(75) Inventor: Gordon Green, Bristol (GB)

(73) Assignee: Materials Solutions, Worcester (GB)

( * ) Notice: Subject to any disclaimer, the term of this patent is extended or adjusted under 35 U.S.C. 154(b) by 331 days.

(21) Appl. No.: 13/101,219

(22) Filed: May 5, 2011

(65) Prior Publication Data

US 2011/0286478 A1 Nov. 24, 2011

Related U.S. Application Data

(60) Provisional application No. 61/346,065, filed on May 19, 2010.

(51) Int. Cl.
| | |
|---|---|
| *G01P 3/36* | (2006.01) |
| *B23K 26/00* | (2014.01) |
| *B29C 67/00* | (2006.01) |
| *B23K 26/06* | (2014.01) |
| *B23K 26/36* | (2014.01) |
| *B23K 26/08* | (2014.01) |
| *B23K 26/03* | (2006.01) |

(52) U.S. Cl.
CPC ......... *B29C 67/0088* (2013.01); *B23K 26/0066* (2013.01); *B23K 26/063* (2013.01); *B23K 26/36* (2013.01); *B23K 26/0807* (2013.01); *B23K 26/03* (2013.01)

USPC .......................................................... 356/28

(58) Field of Classification Search
CPC ..................................................... B23K 26/063
USPC ................................ 356/28; 219/121.6, 121.7
See application file for complete search history.

(56) References Cited

U.S. PATENT DOCUMENTS

| | | | | |
|---|---|---|---|---|
| 4,286,880 | A * | 9/1981 | Young | 356/431 |
| 4,695,698 | A * | 9/1987 | Mayor et al. | 219/121.6 |
| 4,733,308 | A * | 3/1988 | Nakamura et al. | 358/412 |
| 5,606,647 | A * | 2/1997 | Hasebe et al. | 358/1.7 |
| 6,172,328 | B1 * | 1/2001 | Jones et al. | 219/121.68 |
| 6,771,099 | B2 * | 8/2004 | Cavazos et al. | 327/141 |
| 6,951,995 | B2 * | 10/2005 | Couch et al. | 219/121.67 |
| 7,947,575 | B2 * | 5/2011 | Dunne et al. | 438/463 |
| 2003/0098814 | A1 * | 5/2003 | Keller et al. | 343/742 |
| 2010/0133651 | A1 * | 6/2010 | Bruland | 257/529 |

FOREIGN PATENT DOCUMENTS

| | | |
|---|---|---|
| CN | 2900066 Y | 5/2007 |
| EP | 0147580 A | 12/1982 |
| WO | 03/061891 A2 | 7/2003 |

* cited by examiner

*Primary Examiner* — Gregory J Toatley
*Assistant Examiner* — Maurice Smith
(74) *Attorney, Agent, or Firm* — Volentine & Whitt, PLLC

(57) ABSTRACT

The invention relates to a method of verifying a scan speed in a laser scanning system. The method includes modulating the laser of the system to form a periodically modulated feature from which the actual scan speed can be read or deduced.

19 Claims, 5 Drawing Sheets

LASER SCAN SPEED CALIBRATION

This invention relates to any laser processing technology whereby a laser beam is scanned across the surface of a substrate in order to modify the surface of the substrate or thin film thereon. In many such technologies, the attributes of the process, such as surface temperature, penetration depth, etc., are determined by a combination of the various machine settings which must be optimised by the user and adequately controlled during processing. Such settings would include laser power, beam shape, scanning geometry and scan speed, as measured at the processing surface.

BACKGROUND

In many applications, quality assurance requirements dictate that machine settings must be verified periodically and that such verification is traceable to relevant national standards. For example laser power can be verified using a commercially available laser power meter which has been calibrated against a traceable standard by a suitably approved calibration laboratory. Likewise for many applications where there is physical modification of the surface, such as laser marking and additive layer manufacturing (ALM), scanning geometry can be verified against traceable linear measuring devices of various types. This can be performed either as an off-line check by measuring a special test pattern, or on-line by measuring actual product, or by a combination of both. However the verification of scan speed generally poses a problem. It cannot be directly verified by measurements on the product, although it does affect the attributes of the process. For example in ALM, scan speed is known to affect the strength and fatigue properties of the resulting product. Moreover laser processing systems do not generally provide a traceable means of verifying scan speed.

SUMMARY OF THE INVENTION

Embodiments of the invention provide a method of traceably verifying the scan speed of laser scanning systems which leave a physically measurable witness on the substrate.

In this case there are six lines of nominal length 10 mm, graded at 0.2 mm intervals, written with a scan speed of 1000 mm/s. Because ALM systems typically use scan speeds in the region of 1000 mm/s, it has been found convenient to operate the pulse generator with a period of 1 ms, which results in a nominal 10 pulses per line at 1 mm pitch as shown in the example of FIG. 7.

From another aspect the invention consists of a method of verifying a scan speed in a laser scanning system of an apparatus for acting on the surface of an article, the method including modulating the laser to form a periodically modulated feature from which the actual scan speed can be read or deduced.

Conveniently the feature may be generally linear and may consist of a series of space dashes dimensioned in accordance with the modulation. The feature may be two-dimensional or may be raised. The latter would particularly occur, when the laser driven process was an additive layer manufacturing apparatus. Alternatively the laser may cause a pattern to be printed or localised surface colour changes.

The actual scan speed may be derived by measuring the pitch (dx) and computing $S = dx \cdot f$ where S is the scan speed and f is the frequency of modulation.

Alternatively the method may include forming a further feature or features defining a known length (x) alongside the first mentioned feature to determine the number (n) of dashes contained within the length (x) and calculating the scan speed (S) by the formula $$S = x \cdot \frac{f}{n}$$

where f is the frequency of modulation. In the still further arrangement the laser may be frequency modulated by a gated oscillator having two gating conditions in which the laser is modulated for wide periods and the first condition and for y+dy periods in the second condition; wherein a feature is formed for each condition; when a further featural feature is formed defining a predetermined length intended to lie between the linear effect of y and y+dy and wherein the two condition features are compared with the further feature.

As has been mentioned above the laser scanning system may be part of an additive layer manufacturing apparatus and may build the or each feature. Alternatively the laser scanning system may print the or each feature.

Although the invention has been described above it is to be understood that it includes any inventive combination of the features set out above or in the following description.

The invention may be performed in various ways and specific embodiments will now be described by way of example with reference to the accompanying drawings in which.

DESCRIPTION OF THE INVENTION

Figure 1:
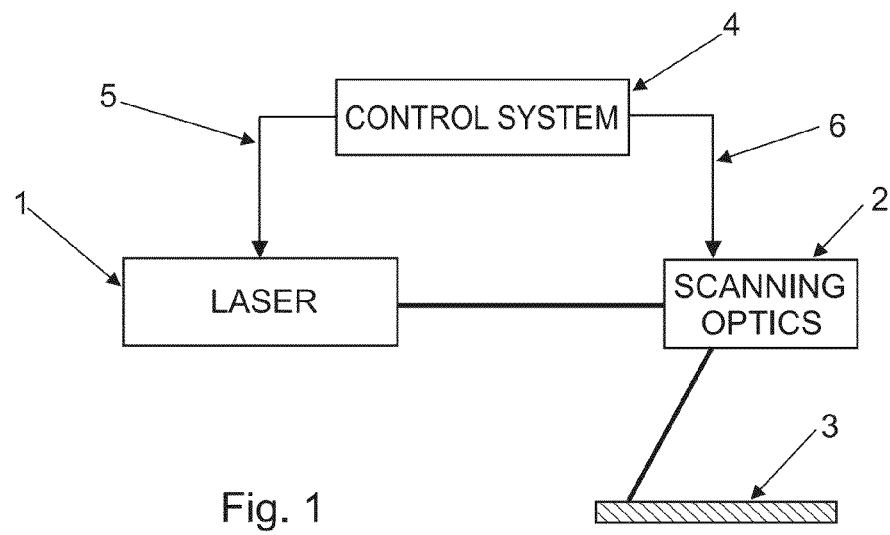
FIG. 1 is a schematic diagram of a laser scanning system.

FIG. 1 is a schematic diagram of a laser scanning system. The output from laser 1 is directed to scanning optics 2 which in turn is capable of directing a focussed beam to any point on substrate 3. Many types of lasers and scanning systems can be utilised, as dictated by the application. A control system 4, generally comprising a computer and appropriate interfacing systems, provides two synchronised control signals: the laser modulation signal 5 switches the laser on and off, while the scan control signal(s) 6 determine where on the substrate the beam is directed to.

Figure 2:
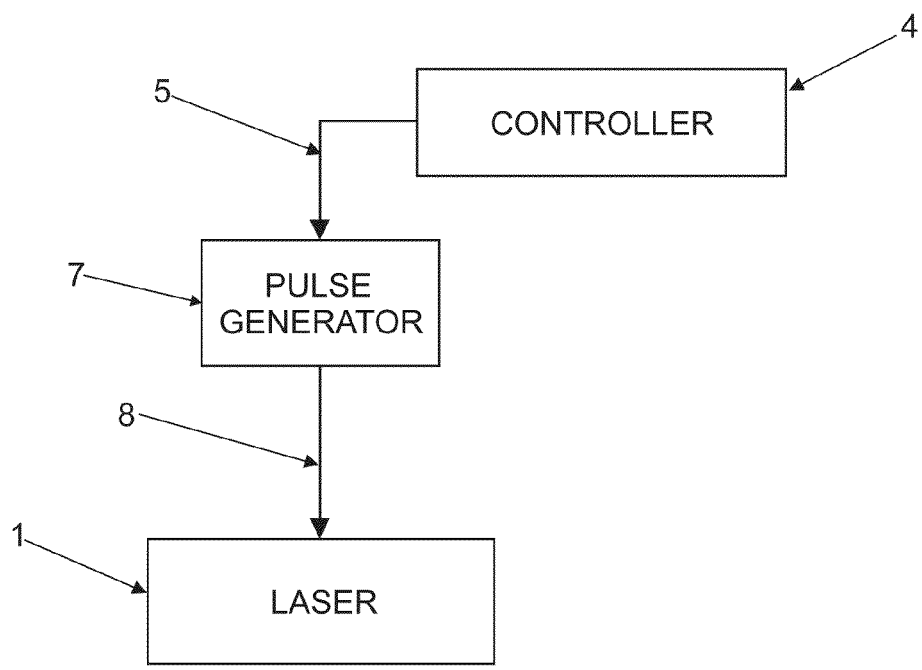
FIG. 2 is a schematic view of a laser modulation with pulse generator.

The class of scanning systems being considered are those which leave a physically measurable witness on the substrate. In such cases the scanning geometry can be verified by a physical measurement of length. Since speed is equal to distance divided by time, the verification of speed can be broken down into the two steps of traceably measuring a length, just as for the scanning geometry, and traceably measuring a time. The time measurement can be achieved by adding an additional modulation signal to the laser by means of a pulse generator, as shown in FIG. 2. Such a pulse generator can be traceably calibrated at an approved laboratory.

Figure 3:
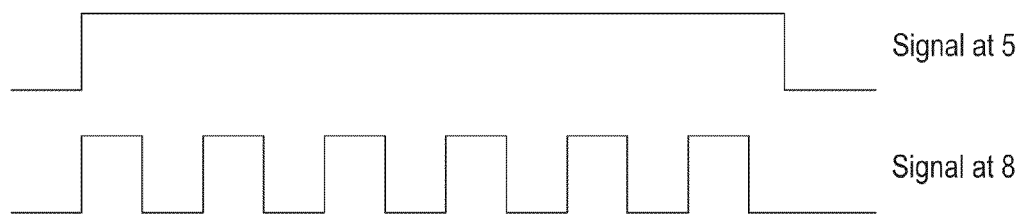
FIG. 3 illustrates signal outputs at points in the diagram in FIG. 3.

The laser modulation signal 5 from the controller 4 is fed into the "gate" input of pulse generator 7. The output signal 8 from the pulse generator in turn is fed to the laser. The signal forms are shown in FIG. 3. When the control system wishes to draw a line on the substrate, the laser is turned on by sending a "logic 1" on signal 5 for the time required to form the line, as shown in the upper trace of FIG. 3. Simultaneous signals to the scanner determine the direction of the line. With the pulse generator in place, the signal to the laser 8 is transformed into a high frequency pulse train lasting for the same duration, as shown in the lower trace. The pulse generator would preferably have a quartz crystal oscillator for accuracy.

Figure 4:
FIG. 4 illustrates the features formed.

The effect on the substrate is to form a dashed line rather than a solid line as shown in FIG. 4. The upper line is the result of drawing a line without the pulse generator. We can measure its length, but we have no knowledge of the scan speed used. The lower line is formed with the pulse generator in place. We can now do one of two things to measure scan speed:

We can measure the pitch between the dashes and multiply by the frequency of the pulse generator to give the scan speed.

$$S = dx \cdot f$$

where S is scan speed, dx is the line pitch as shown in FIG. 4 and f is pulse generator frequency.

Alternatively, we can count the number of pulses within a line of measured length. In this case scan speed is equal to overall length of line multiplied by pulse generator frequency and divided by the number of pulses in the line.

$$S = x \cdot \frac{f}{n}$$

where x is the measured overall line length and n is the number of pulses counted within it.

With method 1 the pitch of the line pulses on the substrate must be traceably measured to the required accuracy. Taking account of the measurement precision, the pulses must be of sufficient length, or a sufficient number of pulses must be included within the measurement in order to achieve this. With method 2, provided that the scan geometry has been previously traceably calibrated, the overall length of the line (x) may be assumed to be correct. Therefore only a simple count of the number of pulses within the line (n) is required. However it should be understood that the number of pulses must still take account of the required calibration precision. For example if calibration to +/−2% is required, then a minimum of 50 pulses must be reliably counted.

It may be that the verification of scan speed needs to be performed on a frequent basis. In such cases it is advantageous to completely avoid the need for measuring and counting operations which may be time consuming and could be subject to operator error. A suitable alternative method is as follows.

Figure 5:
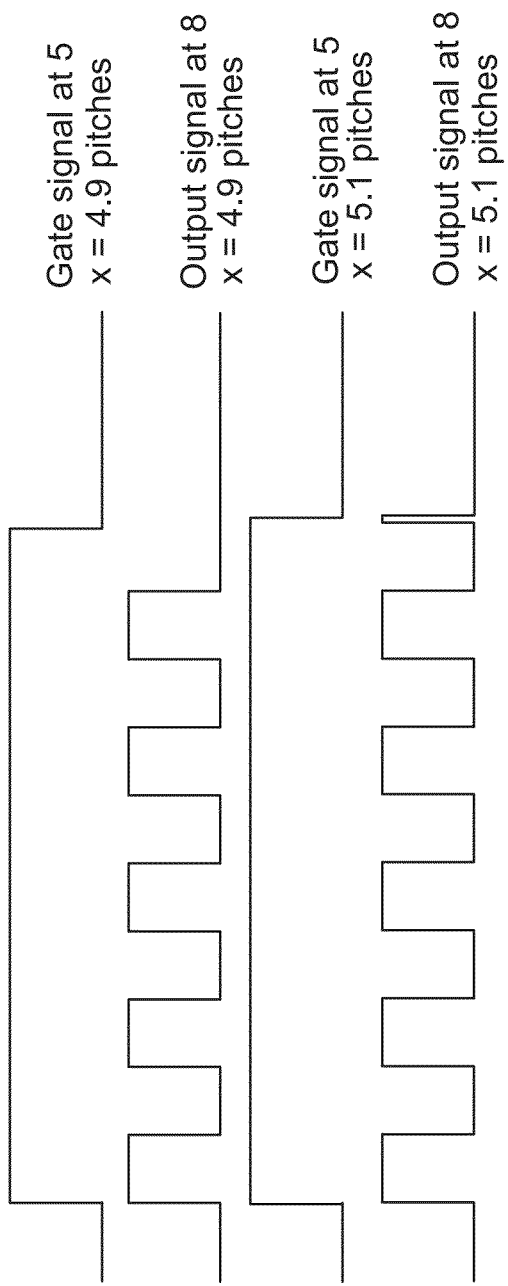
FIG. 5 shows the output of a gated oscillator for two gating conditions.

First consider the pulse generator 7. In its simplest form this is a "gated oscillator" as understood by those skilled in the art. FIG. 5 shows the output of a gated oscillator for two gating conditions. The upper traces show the signals for a line of overall length corresponding to 4.9 oscillator cycles. Five positive pulses are observed, as will be the case for any length between 4.5 and 5.0 oscillator cycles. The lower traces show the signals for a line of overall length corresponding to 5.1 oscillator cycles. In this case an extra partial positive pulse is observed on the output. However it should be understood that a partial pulse may or may not cause a discernible effect on the substrate. If the partial pulse is too short, there will be no visible evidence that the line is in fact longer that 5.0 cycles.

Figure 6:
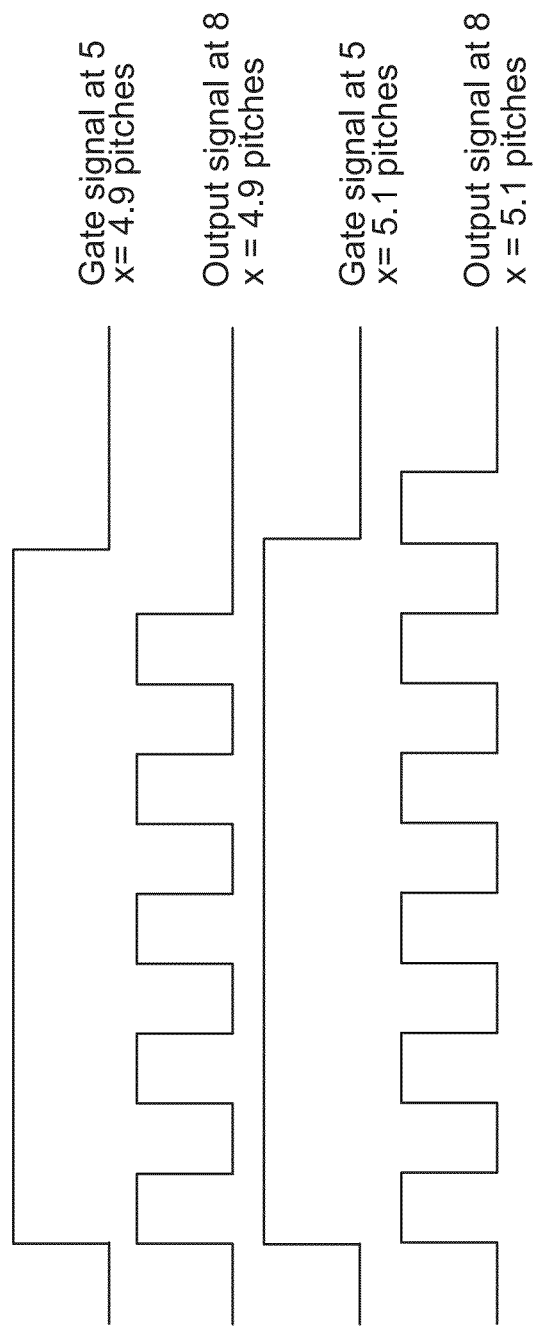
FIG. 6 shows pattern illustrating the use of one of the techniques of the invention.

A feature of some pulse generators is that the final pulse of a gated sequence completes the full positive pulse duration once triggered. It is known to those skilled in the art that this can be achieved by adding an edge triggered mono-stable multivibrator to the output of the gated oscillator. The effect of this is shown in FIG. 6. In the lower traces, where the gate signal is calling for 5.1 periods, we actually get 6 complete pulses. This will be the case for any length greater than 5.0 periods, no matter how slight. Thus this arrangement provides very sensitive discrimination between lines of less than 5.0 periods and lines of greater than 5.0 periods.

A suitable test pattern which exploits this sensitivity is shown in FIG. 6. The upper pattern 11 shows an un-modulated pattern of four lines which are graded in length, corresponding to 4.85, 4.95, 5.05 & 5.15 periods of the pulse generator. The lower pattern 12 shows the same features drawn with the pulse generator enabled. We see that the first two lines have five pulses and the second two have six pulses. Thus the time taken to write a nominal 5.00 period line lies between 4.95 periods and 5.05 periods. In other words we have verified the time taken to write the lines against a traceable time standard to a precision of +/−1%. Since the length of the lines is based on a previous traceable verification of the scan geometry, the traceable verification of scan speed may be inferred via $$S = x \cdot \frac{f}{n}$$

The advantage of this pattern is that scan speed can be quickly verified by inspection of the substrate without the need to make precise measurements or accurately count pulses. A visual assessment that the step from five to six pulses occurs between the second and third line of the test pattern is all that is required. The pattern can be repeated around the scanning plane of the system at appropriate spacing in order to verify the spatial uniformity of velocity across the scanning plane. It can also be orientated in different directions in order to verify the directional consistency of scan speed. A typical application might for example have five X-Y pairs of patterns disposed at the centre and the four corners of a square or circular scanning area.

Clearly the number of lines and other detailed attributes of the pattern can be varied to suit the specific application.

Figure 7:
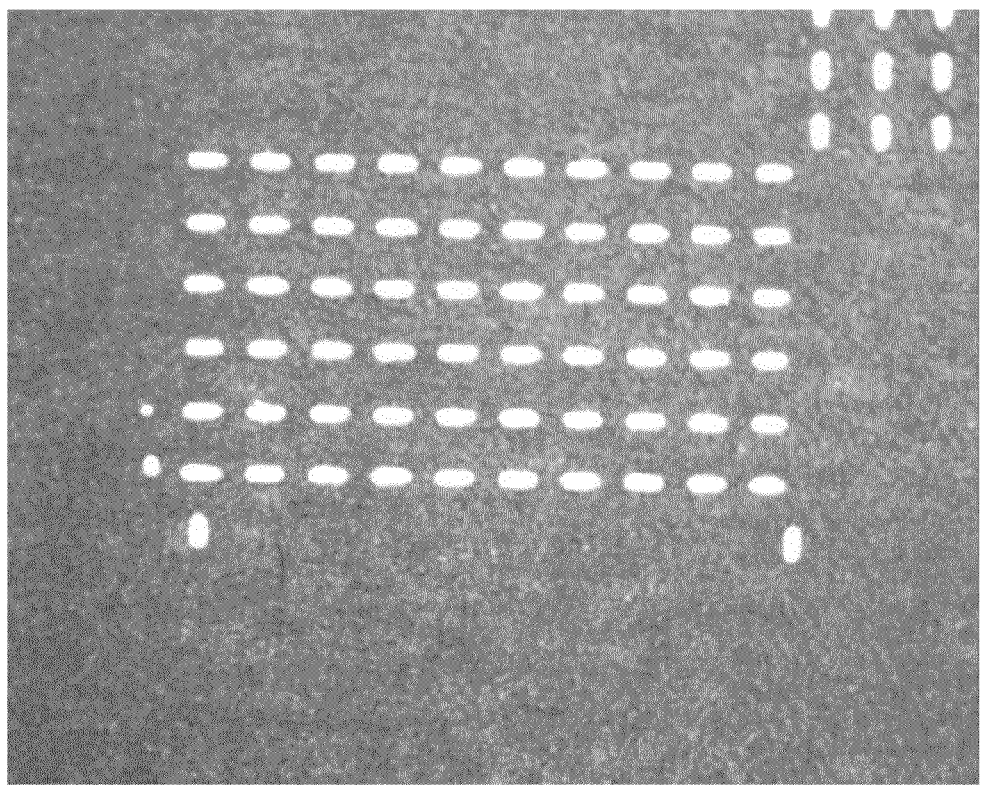
FIG. 7 is a photo micrograph of a test pattern.

The choice of substrate medium for the test pattern requires only that a visual indication of the test pattern can be achieved and readily inspected. It is not necessary to use a typical production work-piece and, since dimensional measurements are not required, dimensional stability is not a critical issue. We have found it convenient to use a carbon coated paper substrate, as can readily be obtained using a photocopier. FIG. 7 is a photo-micrograph showing part of an X-Y test pattern written onto a paper substrate using an ytterbium fibre laser within an ALM system. In this case there are six lines of nominal length 10 mm, graded at 0.2 mm intervals, written with a scan speed of 1000 mm/s. Because ALM systems typically use scan speeds in the region of 1000 mm/s, it has been found convenient to operate the pulse generator with a period of 1 ms, which results in a nominal 10 pulses per line at 1 mm pitch as shown in the example of FIG. 7.

The transition to 11 pulses is seen to occur between the fourth and fifth line. The precision of this pattern is again +/−1%. The eleventh pulse is a little truncated because the scanner has begun to move at high speed to the start of the next line. Nevertheless the principle is seen to work in a practical system. By scaling the test pattern, the same 1 ms pulse generator can be applied to different scan speeds. Hence a scan speed of 2000 mm/s can be checked using a nominal 20 mm line length and 500 mm/s can be checked using a 5 mm line length. Test patterns of this general size and periodicity are particularly convenient for ALM systems because they can be visually assessed by the naked eye.

An advantage of this method is that it is readily added to existing laser scanning systems which do not provide an alternative means of verifying scan speed. All that is required is to insert a suitable pulse generator between the control system and the laser modulation input.

The invention claimed is:

1. A method of verifying a scan speed in a laser scanning system of an apparatus for acting on the surface of articles, the method including:
    modulating a laser of the scanning system while scanning a surface of an article with a beam emitted by the laser to form at least one feature, having a periodic pattern, on the article; and
    determining, based on a characteristic of the at least one feature, whether the actual speed at which the scanning takes place corresponds to a speed to which the laser scanning system is set.

2. A method as claimed in claim 1 wherein the feature is generally linear.

3. A method as claimed in claim 1 wherein the feature includes a series of spaced dashes dimensioned in accordance with the modulation.

4. A method as claimed in claim 1 wherein the feature is raised relative to a surface on which the feature is formed.

5. A method as claimed in claim 3 wherein the dashes are spaced apart by a given pitch, and the determining comprises measuring the pitch (dx) of the dashes, and
    computing $$S = dx \cdot f$$

where S is the actual speed and f is the frequency of the modulation of the laser.

6. A method as claimed in claim 3 wherein the determining comprises forming a further feature or features of a known length (x) alongside the feature having the periodic pattern,
    quantifying the number (n) of dashes contained within the length (x), and
    calculating the actual speed (S) using the formula $$S = x \cdot \frac{f}{n}$$

where f is the frequency of the modulation of the laser.

7. A method as claimed in claim 3 wherein the laser is frequency modulated by a gated oscillator having two gating conditions in which the laser is modulated for y periods in the first condition and for y+dy periods in the second condition such that the at least one feature formed on the article comprises condition features each having a periodic pattern and formed under the gating conditions, respectively, and
    the determining comprises forming at least one feature or features each of a predetermined length intended to lie between the linear effect of y and y+dy, and
    comparing the condition features with the at least one further feature.

8. A method as claimed in claim 1 wherein the laser scanning system is part of an additive layer manufacturing apparatus and builds the at least one feature.

9. A method as claimed in claim 1 wherein the laser scanning system prints the at least one feature.

10. A method of verifying scan speed in a laser scanning system, including:
    writing at least one feature on an article using a laser of the system;
    modulating the laser using a gated oscillator, as the at least one feature is being formed, to impart a periodic variation in the at least one feature; and
    determining, based on a characteristic of the at least one feature, whether the actual speed at which the laser scanning system scans articles with its laser corresponds to a speed to which the laser scanning system is set.

11. A method as claimed in claim 10 wherein the frequency of the gated oscillator is traceable to national standards.

12. A method as claimed in claim 10 wherein the at least one feature is produced in a linear direction, and
    the determining comprises quantifying a number of variations produced in the at least one feature, over a given length in said direction, as a result of modulating the laser, and
    calculating the actual speed based on the number of variations.

13. A method as claimed in claim 10 wherein the variations are spaced apart in said direction by a pitch, and the determining comprises measuring the pitch of the variations, and calculating the actual speed based on the pitch.

14. A method as claimed in claim 10 further comprising preventing partial pulses from being produced in the output of the laser, using a mono-stable multivibrator in conjunction with the gated oscillator.

15. A method as claimed in claim 14 wherein the writing comprises writing a sequence of lines of progressively increasing length on the article, as a test pattern.

16. A method as claimed in claim 15 wherein some of the lines of the test pattern is are orientated in directions different from those of others of the lines of the test pattern.

17. A method as claimed in claim 16 wherein the system is an additive layer manufacturing system.

18. A method as claimed in claim 10 wherein the period of the gated oscillator is of the order of 1 ms and the pitch of the variations in the pattern is of the order of 1 mm.

19. A method as claimed in claim 11 further comprising preventing partial pulses from being produced in the output of the laser, using a mono-stable multivibrator in conjunction with the gated oscillator.

* * * * *